(12) United States Patent
Shah et al.

(10) Patent No.: US 6,863,974 B2
(45) Date of Patent: Mar. 8, 2005

(54) MULTILAYER NON-STICK COATING

(75) Inventors: Shatish Shah, Chicago, IL (US); Henry Padilla, Chicago, IL (US)

(73) Assignee: Akzo Nobel Coatings International B.V. (NL)

( * ) Notice: Subject to any disclaimer, the term of this patent is extended or adjusted under 35 U.S.C. 154(b) by 0 days.

(21) Appl. No.: 10/661,725

(22) Filed: Sep. 12, 2003

(65) Prior Publication Data

US 2004/0110011 A1 Jun. 10, 2004

Related U.S. Application Data

(60) Provisional application No. 60/410,712, filed on Sep. 13, 2002.

(51) Int. Cl.$^7$ .............................. B05D 1/36; B05D 5/08; B32B 15/08; B32B 27/08; B32B 27/20
(52) U.S. Cl. ....................... 428/325; 428/328; 428/329; 428/331; 428/411.1; 428/421; 428/422; 428/457; 428/473.5; 428/474.4; 427/385.5; 427/407.1
(58) Field of Search ............................ 427/385.5, 407.1; 428/325, 328, 329, 330, 331, 411.1, 421, 422, 457, 473.5, 474.4

(56) References Cited

U.S. PATENT DOCUMENTS

| 4,351,882 A | * | 9/1982 | Concannon | 428/422 |
| 5,240,775 A | * | 8/1993 | Tannenbaum | 428/422 |
| 5,250,356 A | | 10/1993 | Batzar | 428/421 |
| 5,478,651 A | * | 12/1995 | Tannenbaum | 428/422 |
| 5,562,991 A | * | 10/1996 | Tannenbaum | 428/421 |
| 6,291,054 B1 | | 9/2001 | Thomas et al. | 428/141 |

FOREIGN PATENT DOCUMENTS

| EP | 433872 | 6/1991 |
| EP | 974404 | 1/2000 |
| WO | WO98/16361 | 4/1998 |
| WO | WO02/14066 | 2/2002 |

OTHER PUBLICATIONS

Search Report of Corresponding International Patent Application Serial No. PCT/EP03/20296, dated Dec. 3, 2003.

\* cited by examiner

*Primary Examiner*—Ramsey Zacharia
(74) *Attorney, Agent, or Firm*—Louis A. Morris

(57) ABSTRACT

A non-stick coating formed on a substrate comprising a primer composition and a topcoat composition, wherein the primer composition is between the topcoat composition and substrate. The primer composition comprises at least one heat resistant adhesion promoter. The topcoat composition comprises at least one fluorocarbon resin and at least one heat resistant adhesion promoter other than a fluoropolymer that may be the same or different than the adhesion promoter of the primer composition. There are inorganic inert particles with an average particle size of at least about 10 micrometers contained in the primer composition. The invention includes the method for forming the coating.

22 Claims, No Drawings

MULTILAYER NON-STICK COATING

CROSS REFERENCE TO RELATED APPLICATION

This application claims priority from Provisional application No. 60/410,712, filed Sep. 13, 2002.

BACKGROUND OF THE INVENTION

1. Field of the Invention

The present invention relates to a substrate coated with a non-stick coating.

2. Prior Art

Non-stick coatings are well known in the art. In these coatings normally fluorocarbon resins are used, since these resins have a low surface energy as well as thermal and chemical resistance. However, non-stick coatings solely based upon fluorocarbon resins suffer from poor adhesion to the substrate and poor scratch and abrasion resistance. Such coatings are easily damaged when cut with a knife or another metal tool. Rubbing or sanding also easily wears these coatings away.

It is known in the art that the adhesion can be improved by roughening of the (metal) substrate, e.g. by grinding, sand blasting, acid etching, brushing or baking a rough layer of glass, ceramic or enamel frit onto the substrate. This is disadvantageous since it is an additional step in the manufacturing process, which can be time consuming and/or requires the heating of the substrate.

To improve the adhesion to substrates and the mechanical properties (in particular, scratch resistance and abrasion resistance) of these coatings, the fluorocarbon resin is mixed with one or more heat resistant binder resins for better adhesion and one or more pigments and/or fillers for coloring and improvement of the mechanical properties.

Non-stick coatings may be applied in a single layer or as a multilayer coating.

U.S. Pat. No. 6,291,054 describes a multilayer non-stick coating wherein the undercoat (primer) comprises a mixture of a fluorocarbon polymer, a heat resistant binder, and large hard ceramic particles. The topcoat comprises a fluorocarbon resin. In the undercoat the heat resistant binder should improve the adhesion to the substrate, the fluorocarbon resin should improve the adhesion between the primer and the topcoat, and the large hard ceramic particles should improve the mechanical properties. However, the presence of the fluorocarbon resin (which has non-stick properties) lowers the adhesion of the primer to the substrate and the adhesion of the ceramic particles within the primer layer.

In WO 02/14066 a single layer non-stick coating is disclosed. This single layer comprises a binder resin, a fluorocarbon resin and filler material. However, this single layer non-stick coating has the same disadvantages as the three-component primer layer described above.

Surprisingly it was found that in a multilayer non-stick coating good adhesion between the primer layer and a next coating layer that is applied on top of the primer layer comprising a fluorocarbon resin can be obtained if the primer layer comprises a heat resistant binder and is substantially free of fluorocarbon resin. Therefore, the primer layer shows optimum adhesion to the substrate and to optionally present particles to improve the abrasion resistance of the coating, whereby the adhesion to the next coating layer is not compromised.

SUMMARY OF THE INVENTION

Accordingly, in one embodiment the present invention comprises a non-stick coating formed on a substrate comprising a primer composition and a topcoat composition. The primer composition is between the topcoat composition and the substrate. The primer composition comprises at least one heat resistant adhesion promoter. The topcoat composition comprises at least one fluorocarbon resin and at least one heat resistant adhesion promoter other than a fluoropolymer that may be the same or different than the adhesion promoter of the primer composition. There are inorganic inert particles with an average particle size of at least about 10 micrometers contained in the primer composition.

In another embodiment, the invention comprises a method of applying a coating to a substrate comprising the sequential steps of:

a. Preparing the surface of the substrate for said coating;
b. Applying a primer composition comprising at least one heat resistant adhesion promoter and inorganic inert particles with an average particle size of at least about 20 micrometers;
c. Applying a topcoat composition comprising at least one fluorocarbon resin and at least one heat resistant adhesion promoter other than a fluoropolymer that may be the same or different than the adhesion promoter of the primer composition; and
d. Baking the coated substrate at a temperature from about 380° C. to about 440° C.

Other embodiments of the invention comprise details concerning compositions, relative amounts of ingredients, particle sizes and method steps.

DETAILED DESCRIPTION OF THE INVENTION

According to the present invention, the substrate, such as aluminum or aluminum shaped articles, is coated with a non-stick coating, wherein the coating is obtained by applying a primer composition and a topcoat composition, wherein the primer composition comprises a heat resistant resin as an adhesion promoter. It is preferred that the primer composition be substantially free of any fluorocarbon resin. The topcoat composition comprises at least one fluorocarbon resin. The topcoat also contains a heat resistant resin in addition to the fluoropolymer resin and is preferably the same heat resistant resin found in the primer composition.

Primer Composition

In addition to the heat resistant binder (adhesion promoter), the primer composition can comprise one or more of the following components: fillers, pigments surfactants, solvents, defoamers, and any other component for a coating composition known to the person skilled in the art. More particularly, in a preferred embodiment, the primer composition comprises from about 10 wt. % to about 60 wt. % of the adhesion promoter, from about 10 wt. % to about 60 wt. % of the inorganic inert particles and from about 10 wt. % to about 60 wt. % of other ingredients selected from the group consisting of fillers, pigments surfactants, solvents, defoamers and mixtures thereof, the wt. % being calculated on basis of the solid content of the primer composition.

The fillers in the primer composition may be selected from the group consisting of barium sulfate, calcium sulfate, calcium carbonate, silicas and silicates.

The primer composition may be substantially free of fluorocarbon resin.

Topcoat Composition

In addition to the fluorocarbon resin and heat resistant resin, the topcoat composition can comprise one or more of the following components: fillers, pigments surfactants, solvents, defoamers, and any other component for a coating composition known to the person skilled in the art. Further the topcoat composition can comprise an acrylic resin and a catalyst. Components that can be present in the topcoat composition include butyl carbitol, triethanolamine, oleic acid, a hydrocarbon fluid, and a cerium based catalyst.

In a preferred embodiment the topcoat composition is a waterborne composition, wherein all ingredients are dispersed in water or are water-soluble.

In a preferred embodiment the topcoat composition also comprises at least 5 wt. % of a fluorocarbon resin dispersion wherein said resin is melt flowable at a temperature above 300° C. The presence of such resin will enable the manufacture of a non-stick coating with a smooth surface and good release properties.

In a preferred embodiment the topcoat composition comprises 55–70 wt. % of fluorocarbon resin dispersion, 3–10 wt. % of a fluorocarbon resin that is flowable at a temperature above 300° C., and 5–15 wt. % of an acrylic resin the wt. % being calculated on the basis of the solid content of the topcoat composition.

In another preferred embodiment, the topcoat composition comprises from about 1 wt. % to about 20 wt. % adhesion promoter, the wt. % being calculated on basis of the solid content of said topcoat composition.

Overcoat (Additional Layers)

If present, the over-coat layer, or layers, composition can comprise one or more of the following components: fillers, pigments surfactants, solvents, defoamers, and any other component for a coating composition known to the person skilled in the art.

In a preferred embodiment, the coating is obtained by applying an over-coat composition, such as a fluoropolymer rich clear-coat which is essentially free of pigments or fillers, after the topcoat composition is applied.

In a further preferred embodiment the over-coat layer composition comprises about 55–70 wt. % of a fluorocarbon resin dispersion, about 3–10 wt. % of a fluorocarbon resin that is melt flowable at a temperature above about 300° C., and about 5–15 wt. % of a film forming resin.

The preferred overcoat composition comprises at least one fluorocarbon resin, most preferably one that is flowable at a temperature above about 300° C.

Fluorocarbon Resin

Examples of fluorocarbon resins that can be used in the present invention include one or a mixture of fluorocarbons selected from the group consisting of polytetrafluoroethylene (PTFE), tetrafluoroethylene (TFE), hexafluoropropylene (HFP), perfluoropropylvinyl ether (PPVE), perfluoroalkyl vinyl ether, perfluoroalkyl vinyl ethylene co-polymers. Commercial examples are copolymers tetrafluoroethylene-hexafluoropropylene (FEP), tetrafluoroethylene-perfluoroalkyl vinyl ether copolymers (PFA) and ethylene-tetrafluoroethylene copolymers (ETFE).

If the contemplated application or use of the coated item is high temperature, the selection of fluoropolymer(s) should be those that are heat stable.

PTFE is an example of a heat resistant or stable fluorocarbon resins that can be used according to the present invention.

Fluorocarbon resins that are melt flowable at a temperature above 300° C. include copolymers of TFE, e.g., FEP and PFA.

The fluorocarbon resins are generally available as a dispersion of the polymer in water. In this dispersion the polymer particles have a small size (usually around 0.2 micrometers) and a surfactant is used to obtain a stable dispersion. For some polymers it is desirable to include an organic liquid in the dispersion.

The fluorocarbon resin can also be present as a polymer powder, in which case normally an organic liquid is used to mix the particles into the coating composition.

Heat Resistant Binder (Adhesion Promoter)

The heat resistant binder that is present in the primer composition is a polymer that is film-forming upon heating (such as by radiation), evaporation of the solvent, and is also thermally stable. The binder shows good adhesion to the substrate and to the fluoropolymer composition that is applied over the primer composition. Preferred binders are those that are soluble or solubilized in water or a mixture of water and one ore more organic solvents for the binder. This solvent should be miscible with water. The solubility of the binder enhances the mixing of the binder with the other components that are present in the primer composition.

An example of a suitable heat resistant binder component is a polyamic acid resin (PAI), which converts to a polyamideimide upon heating. This binder when fully imidized is able to withstand a continuous service temperature in excess of 250° C. In general, the polyamic acid is dissolved in a suitable combination of a solvent, such as Nmethylpyrolidone, water, and suitable tertiary alkyl amine. Another example of a suitable heat resistant binder component is polyethersulfone (PES). These polymers can withstand a continuous service temperature in the range from 170° C. to 190° C. Also polyphenylene sulfide (PPS) can be used as a heat resistant binder, either alone or in a mixture with PAI or PES.

Examples of heat resistant binders that can be used according to the present invention include Torlon@ AI-10 (ex. Solvay), and Radel A-300 (ex. Solvay).

Preferred heat resistant adhesion promoters are selected from the group consisting of polyamideimide resins, polyethersulfone resins and polyphenylene sulfide resins, or combinations thereof.

A most preferred heat resistant adhesion promoter comprises polyamideimide resin.

Inorganic Inert Particles

The primer composition comprises inorganic particles with an average particle size of from about 10 micrometers to about 80 micrometers which are inert with respect to the other components that are present in the composition and can withstand a continuous service temperature in excess of 250° C. In addition, these particles are also stable at the eventual baking temperature of the non-stick coating. The particles are also not soluble in water or any other solvent that is present in the primer composition.

Examples of suitable inorganic particles include inorganic oxides, carbides or nitrides of elements in groups IIA–VB of the periodic table and natural minerals and mixtures thereof. Preferred inorganic particles include particles with an average particle size of at least 20 micrometers and more preferably in the range from about 20 to about 80 micrometers. The inorganic particles have a preferred Mohs hardness of at least about 5, more preferably a mohs hardness of at least about 6. Examples of inorganic particles with Mohs hardness above 5 include alumina, zirconia, silicon carbide, titanium carbide, aluminum boride, and cristobalite.

In addition to the inorganic inert particles mentioned above, the coating compositions used according to the present invention can also comprise fillers, additives, and pigments that are commonly used in the preparation of coating compositions. Fillers can be any fillers known to those skilled in the art, e.g., barium sulfate, calcium sulfate, calcium carbonate, silicas or silicates (such as talc, feldspar, and china clay). Additives such as stabilizers, antioxidants, leveling agents, ant settling agents, matting agents, rheology modifiers, surface-active agents, UV light absorbers, light stabilizers, amine synergists, waxes, or adhesion promoters can also be added.

Application of the Coating

The substrates coated according to the present invention can be aluminum shaped articles, such as pots, pans, lids, mixing spoons, and all other utensils usually employed for food preparation and cooking (baking pans, oven racks etc.) as well as aluminum sheet to be shaped into the aforesaid articles. In both cases, the aluminum support is simply degreased according to any known method, e.g., in an alkaline or acid environment, or with organic solvents. In this treatment, the aluminum support maintains the surface roughness of the aluminum sheet, i.e. below 1.2 micrometers. In addition to the degreasing it is possible to roughen the surface.

The fluorocarbon resin may be applied as a dispersion of the resin in water with a surfactant.

Alternatively, the fluorocarbon resin may be applied as a polymer powder with an organic liquid.

EXAMPLES

The following applies to the examples given below:

Scotch Brite Abrasion Test

The Scotch Brite Abrasion' Test measures a coating's resistance to a constant scrubbing with an abrasive scouring pad. The vertical load on the scouring pad is set to 10 pounds (4.54 kg), and the scouring pad is changed every 10,000 strokes. The number of cycles that are required to scrape the coating down to bare metal is recorded in order to gauge the abrasion resistance of the non-stick system.

Scotch Brite Egg Release Test

The Scotch-Brite Egg Release Test is run in conjunction with the Scotch-Brite Abrasion Test. Every 10,000 strokes an egg is fried on the "wear track" created by the scouring pad to measure the extended food release properties of the non-stick system. Many non-stick coatings show very good release when the cookware is new, but over a few years of moderate use the release properties diminish very rapidly.

The number of cycles that a coating can endure before the egg sticks to the wear track is recorded to determine the true quality of a given non-stick system.

Hand Held Tiger Paw Test

The hand held "Tiger Paw" device is an industry-accepted standard, which was designed to test the resistance of a non-stick coating to long-term kitchen abuse. The Hand Held Tiger Paw consists of a weighted apparatus, which uses 3 "ball point" pens to scratch the coating film. The cookware which is being tested is filled with a thin layer of cooking oil, and heated to 400° Fahrenheit (205° Celsius.)

The Tiger Paw is rotated over the non-stick surface in a circular fashion 2000 times, changing direction every 100 rotations. The coating is then examined for any fraying, blistering, or penetration to bare metal.

The invention will be elucidated with reference to the following examples. These are intended to illustrate the invention but are not to be construed as limiting in any manner the scope thereof.

Control 1

A primer comprised of 6.80 wt % polyamide-imide (Torlon@ AI 10 from Solvay) and 9.28 wt % PTFE (polytetrafluoroethylene dispersion, Fluon@ GP-1 from Asahi Glass) and a topcoat comprised of 59.54 wt % PTFE Dispersion (Polyflon@ 0–46) and 10 4.17 wt % Dyneon™ PFA 6900N Dispersion was applied to an non-gritblast hard anodized aluminum substrate in the form of a frying pan such that dry film thickness of 0.5 mil primer and 0.5 mil topcoat was obtained following a final bake of 427 deg C. (metal temperature) for 3–5 minutes. The resulting baked film was comprised of 24.2 wt % PAI and 19.8 wt % PTFE in the primer and 77.9 wt % PTFE and 4.56 wt % PFA in the topcoat layer.

Example 1

In an embodiment of the invention, A primer comprised of 33.0 wt % polyamideimide (Torlon@ AI 10 from Solvay), 38.0 wt % Silicon Carbide (#600-W from ELECTRO ABRASIVE POWDERS, average ps=11 microns) and no fluoropolymer component, and a topcoat comprised of 58.14 wt % PTFE Dispersion (Fluon@ GP1 from Asahi Glass) and 0.5 wt % polyamide-imide (Torlon@ AI 10 from Solvay) was applied to an non-gritblast hard anodized aluminum substrate in the form of a frying pan such that dry film thickness of 0.5 mil primer and 0.5 mil topcoat was obtained following a final bake of 427 deg C. (metal temperature) for 3–5 minutes. The resulting baked film was comprised of 33.0 wt % PAI and 38.0 wt % SiC in the primer and 90.3 wt % PTFE and 1.3 wt % PAI in the topcoat layer.

Test Results (obtained via the scotch brite egg release test)

| Pan | # Cycles | Results |
| --- | --- | --- |
| Control 1 | <10,000 | Exposure of Substrate |
| Example 1 | 100,000 | Minimal degradation of coating |

What is claimed is:

1. A non-stick coating formed on a substrate comprising a primer composition and a topcoat composition, wherein said primer composition is between said topcoat composition and said substrate, said primer composition comprising at least one heat resistant adhesion promoter, said topcoat composition comprising at least one fluorocarbon resin and at least one heat resistant adhesion promoter, other than a fluoropolymer that may be the same or different than the adhesion promoter of said primer composition, there being inorganic inert particles with an average particle size of at least about 10 micrometers contained in said primer composition, said primer composition is substantially free of fluorocarbon resin.

2. The coating of claim 1 wherein said fluorocarbon resin comprises one or a mixture of fluorocarbons selected from the group consisting of polytetrafluoroethylene, tetrafluoroethylene, hexafluoropropylene, perfluoropropylvinyl ether, perfluoroalkyl vinyl ether, perfluoroalkyl vinyl ethylene and co-polymers tetrafluoroethylene-hexafluoropropylene, tetrafluoroethyleneperfluoroalkyl vinyl ether and ethylene-tetrafluoroethylene.

3. The coating of claim 1 wherein said heat resistant adhesion promoter in said primer composition, or in said topcoat composition, or both, is selected from the group consisting of polyamideimide resins, polyethersulfone resins and polyphenylene sulfide resins, or combinations thereof.

4. The coating of claim 3 wherein said heat resistant adhesion promoter in said primer composition, or in said topcoat composition, or both, comprises polyamideimide resin.

5. The coating of claim 1 wherein said topcoat composition comprises from about 1 wt. % to about 20 wt. % adhesion promoter, the wt. % being calculated on basis of the solid content of said topcoat composition.

6. The topcoat composition of claim 5 comprising 55–70 wt. % of a fluorocarbon resin dispersion, 3–10 wt. % of a fluorocarbon resin that is flowable at a temperature above about 300° C. and about 5–15 Wt. % of an acrylic resin, the wt. % being calculated on the basis of the solid content of said coating.

7. The coating of claim 1 wherein said topcoat composition comprises at least about 5 wt. % of a fluorocarbon resin that is flowable at a temperature above 300° C.

8. The coating of claim 1 wherein the topcoat composition comprises 55–70 wt. % of a heat stable fluorocarbon resin dispersion, 3–10 wt. % of a fluorocarbon resin that is flowable at a temperature above about 300° C. and 5–15 wt. % of an acrylic resin, the wt. %, being calculated on the basis of the solid content of said topcoat composition.

9. The coating of claim 1 wherein said topcoat composition comprises one or more of components selected from the group comprising an acrylic resin, butyl carbitol, triethanolamine, oleic acid, a hydrocarbon and a cerium based catalyst.

10. The coating of claim 1 comprising an overcoat composition over said topcoat composition.

11. The coating of claim 10 wherein said overcoat composition comprises at least one fluorocarbon resin.

12. The coating of claim 10 wherein said overcoat composition comprises at least one fluorocarbon resin that is flowable at a temperature above about 300° C.

13. The coating of claim 10 wherein said overcoat composition is essentially free of pigments or fillers.

14. The coating of claim 1 wherein said inorganic inert particles are selected from the group consisting of ceramics, inorganic oxides, carbides or nitrides of elements in groups IIA–VB of the periodic table, natural minerals and mixtures thereof.

15. The coating of claim 14 wherein said inorganic inert particles have an average particle size from about 10 to about 80 microns and a Mohs hardness of at least about 5.

16. The coating of claim 15 wherein said inorganic inert particles are selected from the group consisting of alumina, zirconia, silicon carbide, titanium carbide, aluminum boride, and cristobalite.

17. The coating of claim 1 wherein said substrate comprises aluminum or aluminum shaped articles.

18. A method of applying a coating to a substrate comprising the sequential steps of:
   a. Preparing the surface of said substrate for said coating;
   b. Applying a primer composition substantially free of fluorocarbon resin comprising at least one heat resistant adhesion promoter and inorganic inert particles with an average particle size of at least about 10 micrometers;
   c. Applying a topcoat composition comprising at least one fluorocarbon resin and at least one heat resistant adhesion promoter other than a fluoropolymer that may be the same or different than the adhesion promoter of said primer composition; and
   d. Baking the coated substrate at a temperature from about 380° C. to about 440° C.

19. The method of claim 18 wherein said fluorocarbon resin is applied as a dispersion of said resin in water with a surfactant.

20. The method of claim 18 wherein said fluorocarbon resin is applied as a polymer powder with an organic liquid.

21. The method of claim 18 wherein said primer composition comprises from about 10 wt. % to about 60 wt. % of said adhesion promoter, from about 10 wt. % to about 60 wt. % of said inorganic inert particles and from about 10 wt. % to about 60 wt. % of other ingredients selected from the group consisting of fillers, pigments, surfactants, solvents, defoamers and mixtures thereof, the wt. % being calculated on basis of the solid content of said primer composition.

22. The method of claim 21 wherein said filters are selected from the group consisting of barium sulfate, calcium sulfate, calcium carbonate, silicas and silicates.

* * * * *